(12) United States Patent
Koch et al.

(10) Patent No.: US 7,726,028 B2
(45) Date of Patent: Jun. 1, 2010

(54) CUTTING DEVICE FOR PIPELINES

(75) Inventors: Elmar Koch, Eslohe (DE); Martin Köper, Attendorn (DE); Franz-Josef Püttmann, Lennestadt (DE)

(73) Assignee: Tracto-Technik GmbH, Lennestadt (DE)

( * ) Notice: Subject to any disclaimer, the term of this patent is extended or adjusted under 35 U.S.C. 154(b) by 66 days.

(21) Appl. No.: 11/328,513

(22) Filed: Jan. 9, 2006

(65) Prior Publication Data
US 2006/0156879 A1    Jul. 20, 2006

(30) Foreign Application Priority Data
Jan. 10, 2005   (DE) ................. 10 2005 001 222

(51) Int. Cl.
   *B23D 21/06*   (2006.01)
   *E21B 29/00*   (2006.01)
(52) U.S. Cl. ........................................ 30/92.5; 405/156
(58) Field of Classification Search .................. 30/92.5, 30/103, 92, 93; 405/156; 166/55.2
See application file for complete search history.

(56) References Cited

U.S. PATENT DOCUMENTS

| 1,125,513 | A | * | 1/1915 | Graham | 166/55.3 |
| 3,782,157 | A | | 1/1974 | Foulks et al. | |
| 3,988,826 | A | * | 11/1976 | Heikkala | 30/92.5 |
| 4,106,561 | A | | 8/1978 | Jerome et al. | |
| 5,098,225 | A | * | 3/1992 | Rockower et al. | 30/92.5 |
| 5,439,320 | A | * | 8/1995 | Abrams | 405/184.3 |
| 6,131,616 | A | * | 10/2000 | Tatsuta et al. | 138/121 |
| 6,340,270 | B2 | * | 1/2002 | Puttmann | 30/92.5 |
| 2005/0262698 | A1 | * | 12/2005 | Tjader | 30/92.5 |

FOREIGN PATENT DOCUMENTS

| DE | 198 31 190 | 10/1999 |
| GB | 834870 | 5/1960 |

* cited by examiner

*Primary Examiner*—Stephen Choi
(74) *Attorney, Agent, or Firm*—Henry M. Feiereisen; Ursula B. Day

(57) ABSTRACT

A cutting device for cutting or bursting a pipeline includes a basic body having at least one cutting or perforating element, wherein the cutting or perforating element discontinuously cuts the pipeline in the longitudinal direction or at least discontinuously weakens the pipe material.

7 Claims, 5 Drawing Sheets

US 7,726,028 B2

CUTTING DEVICE FOR PIPELINES

CROSS-REFERENCES TO RELATED APPLICATIONS

This application claims the priority of German Patent Application, Serial No. 10 2005 001 222.1-14, filed Jan. 10, 2005, pursuant to 35 U.S.C. 119(a)-(d), the content of which is incorporated herein by reference.

BACKGROUND OF THE INVENTION

The invention relates to a cutting device for cutting or bursting pipelines.

Nothing in the following discussion of the state of the art is to be construed as an admission of prior art.

A cutting device is disclosed for example in German Pat. No. DE 198 31 190 C1. The cutting device is pulled via a linkage through a pipeline to be cut and provided on one side of an elongate basic body with three rotatably mounted cutting rollers arranged in a line and at a distance from one another. Situated opposite each of the cutting rollers is a support roller which is used to bear the transverse forces on the pipe shell caused by the cutting rollers.

The first cutting roller as seen in the pulling direction is offset from the central position to such an extent that its cutting edge directly severs the pipe shell across its full thickness.

The two following cutting rollers are arranged with an even greater offset in the direction of the pipe shell than the first cutting roller. They are responsible for reliably severing periodically occurring pipe sleeves or isolated repair clamps.

High pulling forces are required in the case of such cutting rollers which cut the pipe continuously in the longitudinal direction. These pulling forces must be borne by the old underground pipe to be cut and at the front plate of the pulling device used. Where there is major damage to the old pipe, as may be caused for example by pitting, the force can no longer be reliably transmitted via the old pipe and the old pipe may be caused to buckle. In this case, whole pieces of pipe may break off depending on the pipe material, or the pipe pushes in on itself to form corrugations. This may considerably hinder the subsequent cutting operation or make it impossible.

Furthermore, the pipe fragments broken off may result in damage to a new pipe which is subsequently pulled in.

It would therefore be desirable and advantageous to provide an improved cutting device and improved method for cutting pipelines in the longitudinal direction to obviate prior art shortcomings.

SUMMARY OF THE INVENTION

According to one aspect of the present invention, a cutting device for cutting or bursting pipelines includes a basic body having at least one cutting or perforating element, wherein the cutting or perforating element discontinuously cuts the pipeline in the longitudinal direction or at least discontinuously weakens the pipe material.

The present invention resolves prior art problems by the provision of the basic body which is moved through a pipeline to be cut and includes at least one cutting or perforating element to cut the pipeline in the longitudinal direction or to weaken the pipe material. Thus, the cutting operation taking place discontinuously. As a result, generation of uncontrolled cracks when cutting and resultant formation of fragments are reduced.

Discontinuous cutting or weakening is understood according to the invention to mean that cuts are made in the shell of the pipeline over respectively defined distances with different depths of cut in a periodically repeating sequence. This may involve for example that the shell of the pipeline is completely severed in one portion while in a following portion no cut or only one cut is made through part of the shell thickness. A perforated cutting line consequently results.

The depths of cut in the respective portions may be selected as desired. It is also possible of course to provide more than two cutting portions with different depths of cut one behind the other before the periodic repetition of the cutting sequence ensues.

Pipelines are understood to be all elongate hollow bodies which are closed or partially closed over their circumference. These hollow bodies may have any desired cross section and be laid either underground or above ground.

The cutting or perforating device preferably comprises a cutting roller with a toothed wheel-shaped contour. The toothed wheel-shaped contour may in turn be selected as desired. For example, the toothed wheel-shaped contour may have pointed or rounded or flattened "tooth tips". The tooth flanks may extend straight or with a curve. The tooth base may also be of pointed, curved or flattened design.

Saw blade-shaped cutting knives may also be used. Another possibility comprises a corrugated profile of the cutting roller in which some or all of the transitions between the "tooth tip", "tooth flank" and "tooth base" are rounded.

The cutting roller is preferably dimensioned or arranged in such a way that the tip circle of the toothed wheel-shaped cutting roller virtually completely, or, if appropriate, completely, penetrates the shell of the pipeline at least on one side and the root circle does not penetrate or only partially penetrates the shell of the pipeline. If the basic body of the cutting device then moves through the pipeline, the action of the toothed wheel-shaped cutting roller rolling on the inner side of the shell causes the "teeth" of the toothed wheel-shaped cutting roller to penetrate (cut or weaken) the shell, while in the respectively following portion the shell remains (partially) intact along the cutting line. A periodically discontinuous cutting line consequently results.

The advantageous action of such a cutting roller is allowed by a simple and cost-effective construction. Other cutting elements which enable the pipeline to be cut discontinuously in the longitudinal direction may, for example, involve a cutting knife being alternately radially deflected and retracted again. Thermal and laser cutting processes are also possible.

The cutting device advantageously has a second cutting or perforating element which follows the first cutting or perforating element. This second cutting or perforating element—preferably once more a mechanical cutting element, for example a cutting roller and/or a cutting knife—may follow the first cutting element in the same cutting line, with the result that the discontinuously cut pipeline can be completely cut through. For this purpose, the cutting roller or the cutting knife may have a radial extent which is greater than or equal to the external dimensions (if appropriate including connection sleeves) of the pipeline.

It is of course possible once again to use other cutting elements, for example also thermally acting cutting elements, for the second cutting element.

The two cutting or perforating elements following one another are preferably arranged with a defined minimum spacing from one another. Maintaining the minimum spacing between the two cutting or perforating elements is particularly advantageous when using cutting rollers and/or cutting knives for the second cutting element. Since the second cutting or perforating element preferably completely penetrates the shell of the pipeline and the cutting element has a certain minimum thickness, the pipeline is caused to widen as a result of guiding the cutter within the cut. Were this widening to occur too closely behind the first cutting or perforating element, the resulting elevated stresses within the pipeline could lead to uncontrolled cracking during the discontinuous cutting by the first cutting or perforating element. The diameter of the pipeline to be cut may be taken for example as a guideline value for an advantageous minimum spacing. A larger spacing is usually not disadvantageous, even being advantageous as a rule.

According to another feature of the present invention, the first and the second cutting or perforating element are arranged on respective dedicated basic bodies. These basic bodies may be connected to one another in an articulated manner and preferably via a quick coupling of any type.

The necessary spacing between the two basic bodies, and thus the two cutting elements, may also be produced for example by fastening a linkage section, as also used for the pulling linkage, between the two basic bodies. The articulated connection of the two basic bodies with one another makes it possible to ensure that the cutting device according to the invention, having a large longitudinal extent in some cases, can be moved smoothly without jamming within a pipe run which may not be completely rectilinear.

The modular structure of the cutting device with basic bodies connected via quick couplings and having one or more respective cutting or perforating elements is also advantageous for mounting or demounting in narrow pits.

The cutting device may also be adapted in modular fashion to the particular task.

A problem when cutting pipelines may also be presented by repair clamps. These are frequently applied subsequently to damage to the pipeline and generally have a much greater diameter than the connection sleeves of the individual pipe portions. Consequently, the repair clamps in the prior art are not completely cut by the second cutting element, the radial extent of which has been advantageously adapted to the outer radius of the connection sleeves.

In order to counter the occurrence of repair clamps, the cutting device according to the invention may comprise a third cutting or perforating element which follows the second cutting or perforating element and protrudes beyond the latter in terms of its radial extent. Its radial extent is preferably matched to the external dimensions of conventional repair clamps for pipelines. Recourse is preferably once again had to a cutting roller and/or a cutting knife as the third cutting element on account of its simple construction.

Given the preferred modular configuration of the cutting device, the third cutting or perforating element is likewise arranged on a dedicated basic body, which again is preferably connected to the basic body of the second cutting element via a quick coupling. It is also possible, however, to arrange individual or all three of the cutting or perforating elements jointly on one basic body. It is also possible of course for there to be more than three cutting or perforating elements depending on the particular application.

In an alternative embodiment of the invention, provision may be made for the first cutting or perforating element which cuts the pipelines discontinuously in the longitudinal direction to be followed by a widening element in addition to or instead of the second cutting or perforating element. The widening element may, for example, comprise a conical or pointed basic body whose external dimensions exceed the internal dimensions of the pipelines. The movement of the widening element through the pipeline consequently produces a bursting stress within the pipe shell which leads to the pipe shell tearing completely along the perforated cutting line.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
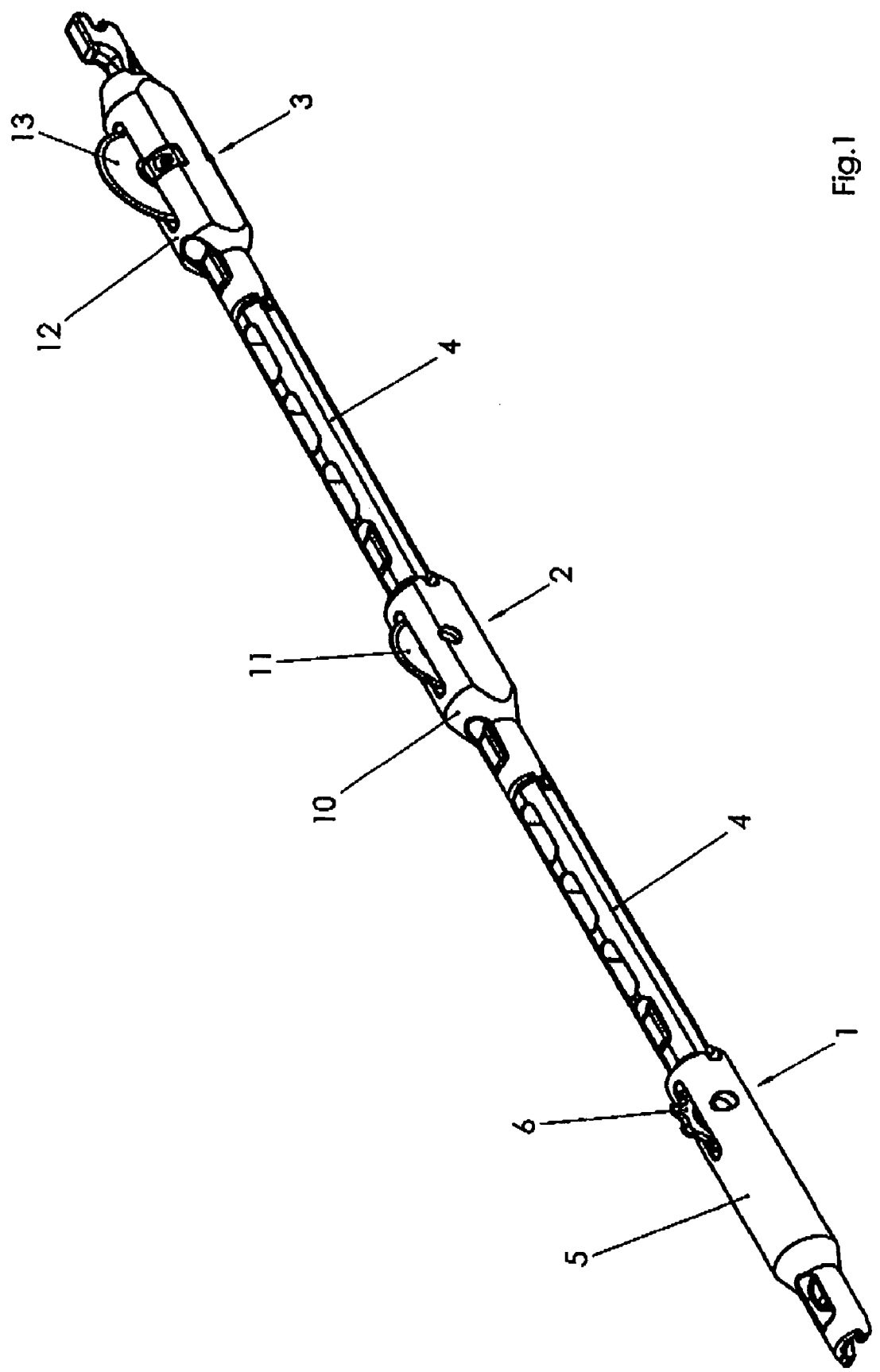
FIG. 1 is an isometric representation showing a cutting device according to the present invention comprising three cutting element modules connected in succession.
Figure 2:
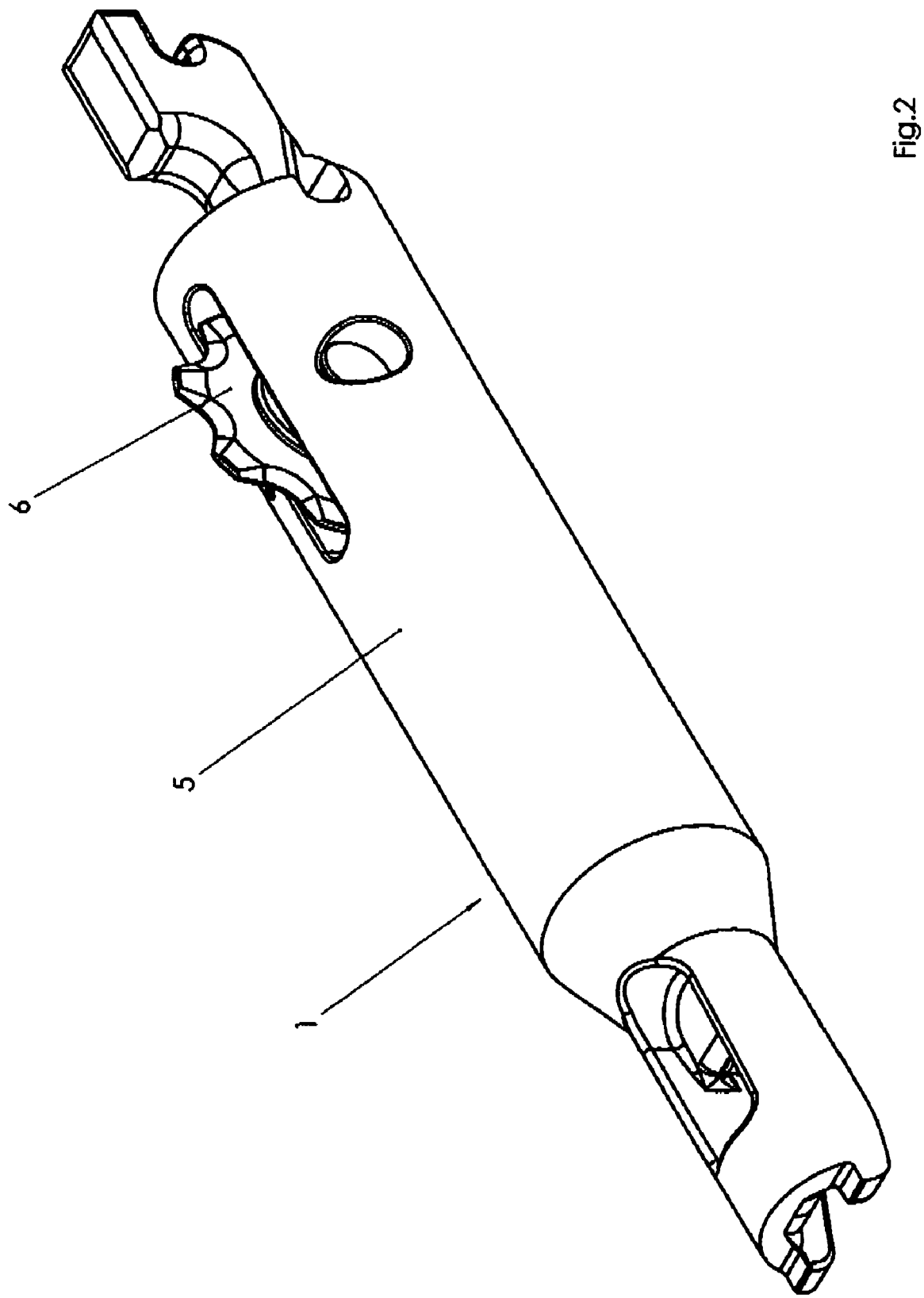
FIG. 2 is an isometric view showing a first cutting element module from FIG. 1 with a toothed wheel-shaped cutting roller.
Figure 3:
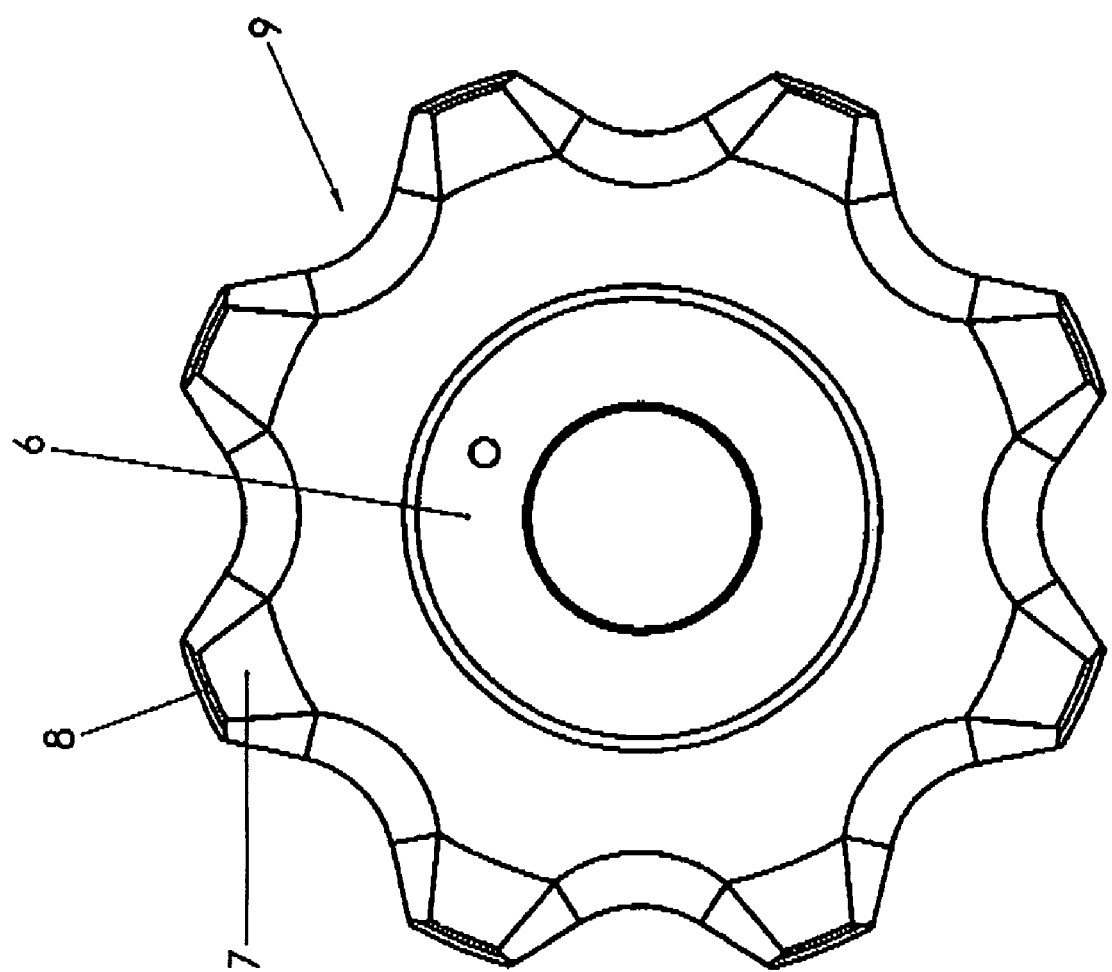
FIG. 3 shows a side view of the toothed wheel-shaped cutting roller.
Figure 4:
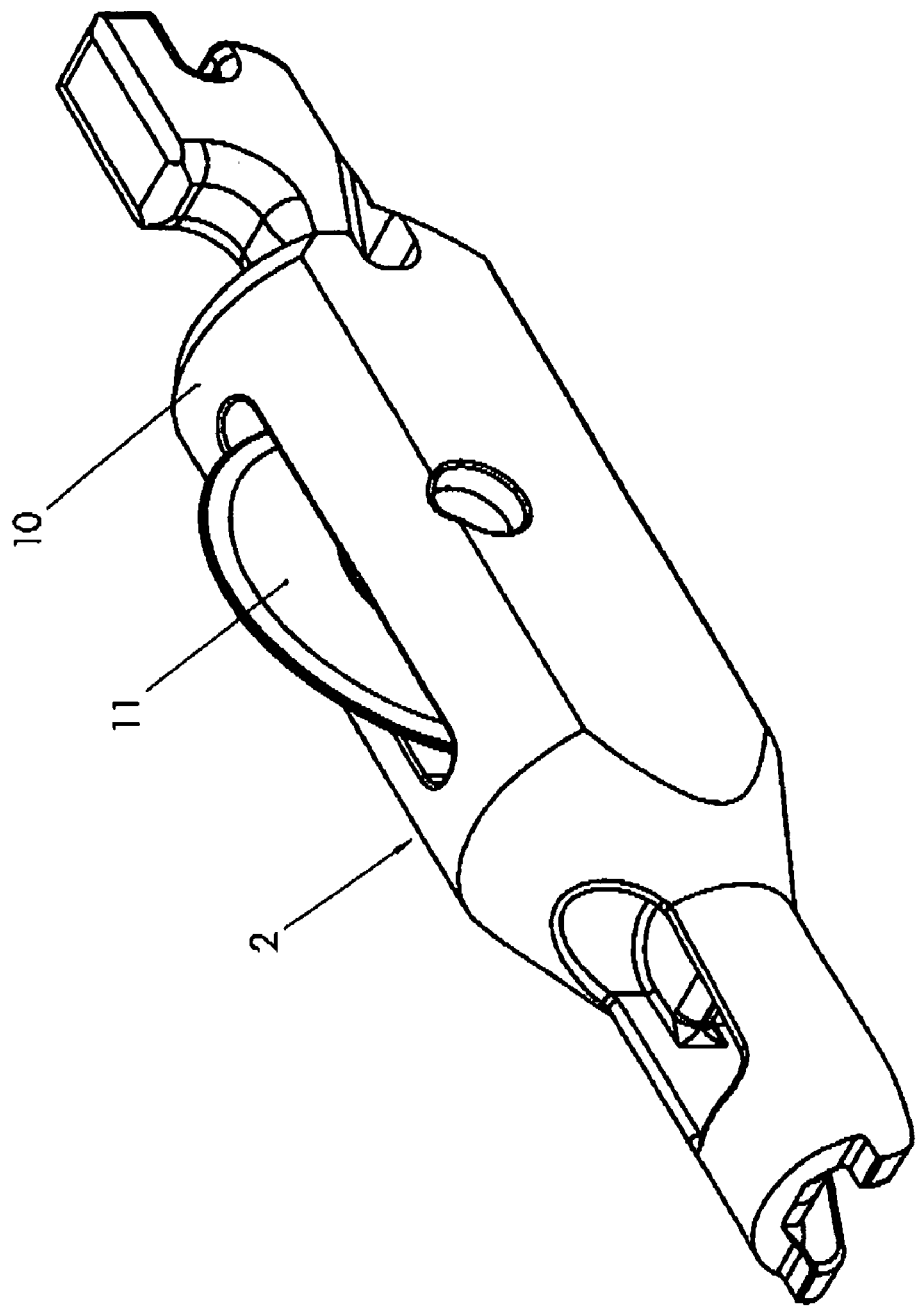
FIG. 4 shows an isometric view of a second cutting element module of FIG. 1 with a smooth, circular cutting roller.
Figure 5:
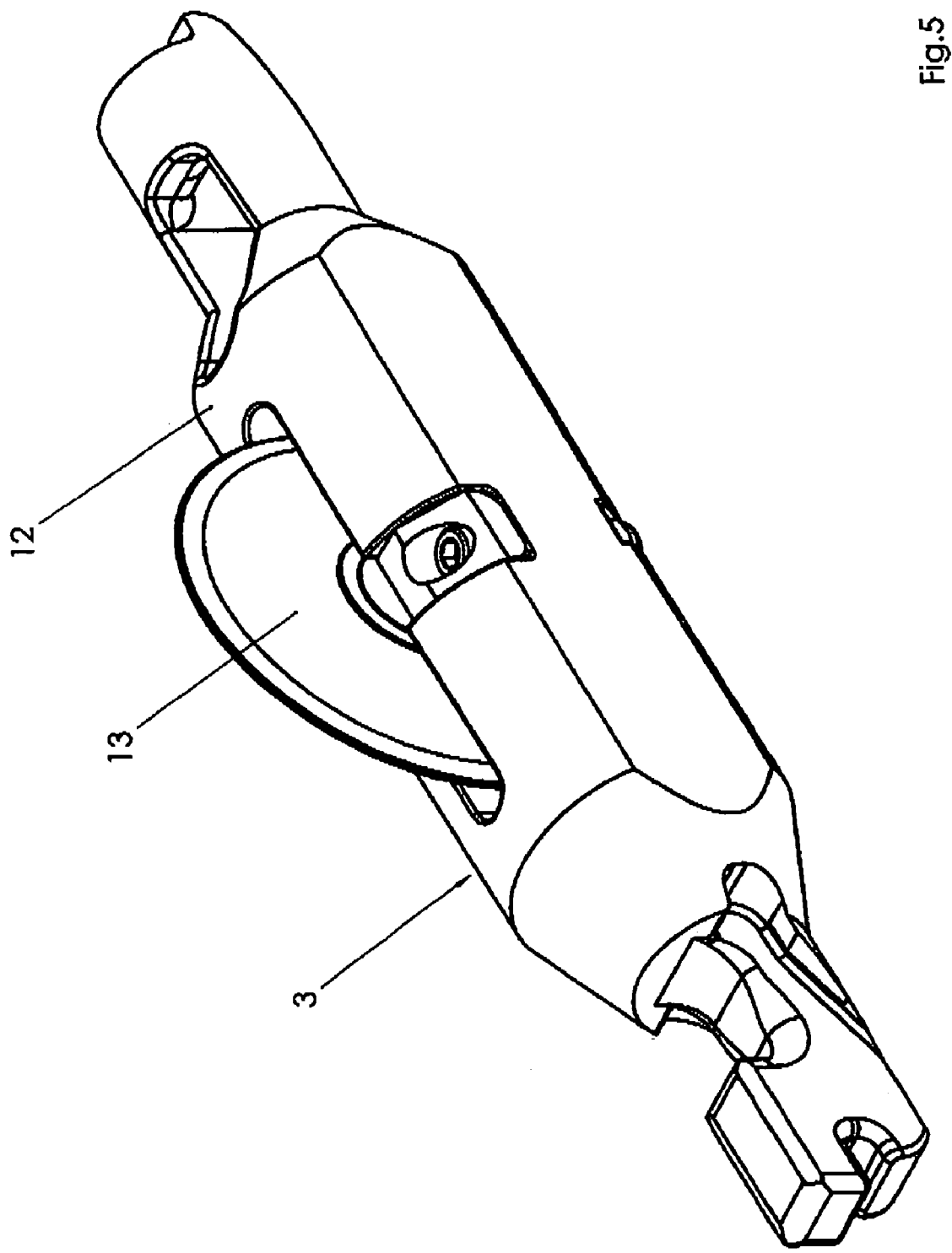
FIG. 5 shows an isometric view of the third cutting element module of FIG. 1 with a smooth, circular and outwardly offset cutting roller.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a cutting device according to the present invention, essentially including three cutting element modules 1, 2, 3 which are connected to one another via short linkage sections 4. The first cutting element module 1 has a cross-sectionally circular, elongate basic body 5 whose two ends are respectively provided with part of a linkage quick coupling. A toothed wheel-shaped cutting roller 6 is rotatably mounted in a longitudinal pocket.

The toothed wheel-shaped cutting roller 6 comprises individual cutting cogs 7 with flattened crests 8 in a periodic spacing. The individual cutting cogs 7 are connected via portions which represent parabolic indentations 9. The cutting roller 6 is provided with a pointed cutter over the entire circumference (cogs and indentations). In this case, the cutting edge itself may also be rounded.

The dimensions of the cutting roller 6 and its arrangement within the basic body 5 are selected such that the tip circle of the toothed wheel-shaped cutting roller (the imaginary circle which connects the flattened cogs 7) virtually completely penetrates the shell of the pipeline (not shown) which is to be cut. In contrast thereto, the lowest point of the indentation 9 between two cogs (point of inflection of the parabolic indentation) is intended either not to penetrate the shell of the pipeline at all or only to a small extent.

The rolling of the toothed wheel-shaped cutting roller 6 on the pipe shell consequently causes a discontinuous cutting edge to be produced during the movement of the cutting device through the pipeline to be cut, the cogs 7 penetrating the shell of the pipeline and the shell remaining (partially) untouched in the portions 9 between two cogs. The transition between the flattened cog and the parabolic portion is designed to be pointed, with the result that the first engagement of a cog 7 in the shell of the pipeline takes place under a high point load and consequently with a high cutting action.

The second cutting element module 2 likewise has an elongate basic body 10 with linkage quick coupling parts arranged at both ends. A smooth, circular cutting roller 11 is provided instead of a toothed wheel-shaped cutting roller. The dimensioning and the arrangement of the cutting roller 11 within the basic body 10 are selected so that the pointed edge of the cutting roller 11 completely penetrates the shell of the pipeline to be cut.

The third cutting element module 3, like the previous two cutting element modules 1, 2, has an elongate basic body 12 with parts of a linkage quick coupling. The axis of rotation of the smooth, circular cutting roller 13 is arranged at the outermost edge in the case of the third cutting element module 3, with the result that the radial extent of the cutting roller 13 protrudes markedly beyond that of the second cutting element module 2. The third cutting element module 3 can be attached to the cutting device as required if repair clamps or other obstacles whose dimensions exceed those of the pipe are expected during the cutting operation.

The cutting element modules are connected between one another or to the linkage sections arranged in between via quick couplings. The quick couplings used in the exemplary embodiment are configured in such a way that coupling or release is effected in a non-collinear position of the individual elements with respect to one another. Completely push-resistant rigid coupling between the elements to be coupled together can be achieved only after pivoting them into the collinear position and applying a pressing force, whereby the two portions of the quick coupling move over a short distance relative to one another in the longitudinal axial direction. In this case, projections on one coupling part are pushed into corresponding pockets in the other coupling part. The cutting device can thus also be pushed through the pipeline using the linkage represented. Applying a pulling force causes the projections to be moved out of the pockets. The result is a relative mobility about an axis of rotation.

If the cutting device according to the invention is pulled through a pipeline, the first cutting element module 1 having the toothed wheel-shaped cutting roller 6 thus produces a discontinuous, perforated cutting line. The remaining webs within this cutting line are severed by the cutting roller 11 of the cutting element module 2. The cutting roller 13 of the following cutting element module 3 ensures the destruction of repair clamps or other obstacles which are not interrupted by the cutting roller 11 of the cutting element module 2 on account of its smaller radial extent.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. In combination:
a pipeline having an outside diameter; and
a cutting device for cutting or bursting the pipeline, said cutting device comprising a basic body having a first cutting or perforating element, which is constructed to have an outside diameter which at least in one area is smaller than the outside diameter of the pipeline so as to discontinuously cut the pipeline in a longitudinal direction or at least discontinuously weaken the pipe material of the pipeline, and a second cutting or perforating element having a cutting roller and/or a cutting knife which follows the first cutting or perforating element in a same cutting line, wherein the cutting roller or cutting knife of the second cutting or perforating element has a radial dimension which is greater than or equal to an outer radius of the pipeline to completely cut through the pipeline.

2. The combination of claim 1, wherein the first cutting or perforating element has a cutting roller with a toothed wheel-shaped contour.

3. The combination of claim 2, wherein the culling roller is dimensioned or arranged in such a way that a tip circle of the culling roller virtually completely penetrates a shell of the pipeline at least on one side thereof whereas a root circle does not penetrate or only partially penetrates the shell of the pipeline.

4. The combination of claim 1, wherein the second cutting or perforating element has a basic body for receiving the cutting roller and/or a cutting knife, said basic bodies of first and second cutting or perforating elements being connected to one another in an articulated manner.

5. The combination of claim 4, wherein the basic bodies of first and second cutting or perforating elements are connected to one another via a quick coupling.

6. The combination of claim 1, further comprising a third cutting or perforating element having a cutting roller and/or a cutting knife which follows the second cutting element and is sized to radially project beyond the second cutting element.

7. The combination of claim 1, wherein the first cutting or perforating element is constructed to produce a discontinuous cutting line in the longitudinal direction, with an area in which pipe material of the pipeline is penetrated and an area in which the pipe material of the pipeline is weakened.

* * * * *

UNITED STATES PATENT AND TRADEMARK OFFICE
CERTIFICATE OF CORRECTION

PATENT NO. : 7,726,028 B2  Page 1 of 1
APPLICATION NO. : 11/328513
DATED : June 1, 2010
INVENTOR(S) : Elmar Koch, Martin Köper and Franz-Joseph Püttmann It is certified that error appears in the above-identified patent and that said Letters Patent is hereby corrected as shown below:

Column 6, line 32, change "culling" to --cutting--;

Column 6, line 32, after "roller" add --of the first cutting or perforating element--;

Column 6, line 34, change "culling" to --cutting--.

Signed and Sealed this

Sixth Day of July, 2010

David J. Kappos
*Director of the United States Patent and Trademark Office*